(12) United States Patent
Kobayashi et al.

(10) Patent No.: US 8,604,992 B2
(45) Date of Patent: Dec. 10, 2013

(54) MAGNETIC MATERIAL ANTENNA AND ANTENNA DEVICE

(75) Inventors: Eiichi Kobayashi, Takatsuki (JP); Takuma Sawaya, Kyoto (JP); Hiroyuki Kubo, Kanazawa (JP)

(73) Assignee: Murata Manufacturing Co., Ltd., Kyoto-Fu (JP)

( * ) Notice: Subject to any disclaimer, the term of this patent is extended or adjusted under 35 U.S.C. 154(b) by 60 days.

(21) Appl. No.: 12/816,100

(22) Filed: Jun. 15, 2010

(65) Prior Publication Data

US 2010/0309081 A1 Dec. 9, 2010

Related U.S. Application Data

(63) Continuation of application No. PCT/JP2008/068452, filed on Oct. 10, 2008.

(30) Foreign Application Priority Data

Dec. 18, 2007 (JP) ................................ 2007-326604

(51) Int. Cl.
*H01Q 7/08* (2006.01)
*H01Q 7/06* (2006.01)

(52) U.S. Cl.
USPC ..................... 343/788; 343/700 MS; 343/787

(58) Field of Classification Search
USPC ........... 343/787–788; 336/173, 177; 455/41.1
See application file for complete search history.

(56) References Cited

U.S. PATENT DOCUMENTS

| | | | | |
|---|---|---|---|---|
| 3,750,180 | A * | 7/1973 | Fujimoto et al. | 343/788 |
| 6,028,568 | A * | 2/2000 | Asakura et al. | 343/895 |
| 6,680,713 | B2 * | 1/2004 | Yokoshima et al. | 343/895 |
| 7,057,576 | B2 * | 6/2006 | Mukoyama | 343/895 |
| 7,088,304 | B2 * | 8/2006 | Endo et al. | 343/788 |
| 7,710,341 | B2 * | 5/2010 | Kubo et al. | 343/788 |
| 7,924,235 | B2 * | 4/2011 | Fujimoto et al. | 343/787 |
| 8,256,684 | B2 * | 9/2012 | Sugita et al. | 235/492 |
| 2010/0156729 | A1 * | 6/2010 | Kubo et al. | 343/702 |

FOREIGN PATENT DOCUMENTS

| | | | |
|---|---|---|---|
| CN | 1871743 | A | 11/2006 |
| JP | 2002-325013 | A | 11/2002 |
| JP | 2003-022912 | A | 1/2003 |
| JP | 2005-033461 | A | 2/2005 |
| JP | 2005033461 | A * | 2/2005 |
| WO | WO 2006134935 | A1 * | 12/2006 |
| WO | WO/2007/105348 | | * 9/2007 |

OTHER PUBLICATIONS

International Search Report; PCT/JP2008/068452; Dec. 16, 2008.
H.Nishiwaki; Written Opinion of the International Searching Authority; PCT/JP2008/068452; Dec. 16, 2008.
The First Office Action from the State Intellectual Property Office of People's Republic of China issued on Jun. 21, 2012; Chinese Patent Application No. 200880120546.3 with translation.

* cited by examiner

*Primary Examiner* — Jacob Y Choi
*Assistant Examiner* — Amal Patel
(74) *Attorney, Agent, or Firm* — Studebaker & Brackett PC

(57) ABSTRACT

A spiral coil conductor defining its winding central section as a conductor opening section is formed on a flexible substrate. The flexible substrate has a U shaped bend along a line passing through the conductor opening section so as to envelop a magnetic material core. The magnetic material core is arranged in a state where its end face faces the bend of the flexible substrate, and the magnetic material core includes cut shapes provided at a portion of the end face. The portion at the end face faces coil conductor sections at the bend of the flexible substrate, and the cut shapes separate the portion apart from the coil conductor sections.

9 Claims, 15 Drawing Sheets

MAGNETIC MATERIAL ANTENNA AND ANTENNA DEVICE

CROSS REFERENCE TO RELATED APPLICATIONS

The present application is a continuation of International Application No. PCT/JP2008/068452 filed on Oct. 10, 2008, which claims priority to Japanese Patent Application No. 2007-326604 filed on Dec. 18, 2007, the entire contents of each of these applications being incorporated herein by reference in their entirety.

FIELD OF THE INVENTION

The present invention relates to a magnetic material antenna and an antenna device for use in a radio frequency identification (RFID) system that communicates with an external apparatus through an electromagnetic signal or other systems.

BACKGROUND

In RFID systems widely employed in recent years, both a mobile electronic apparatus and a reader/writer in a mobile phone, or other equipment, incorporate an antenna for information communication in which data is exchanged between them. In particular, it is strongly desired that an antenna incorporated in a mobile electronic apparatus achieve high performance, be inexpensive, and be small. Japanese Patent No. 3772778 (Patent Document 1) discloses a magnetic material antenna including a magnetic material core as one example that attempts to meet these requirements.

FIG. 1 is a perspective view of a magnetic material antenna illustrated in Patent Document 1. This antenna 10 includes a core member (magnetic material core) 12 and a single electrical insulating film (flexible substrate) 14 having a first principal surface on which a spiral section 13a is formed by a continuous first conductor (coil conductor) 13. A second conductor 15 is formed on a second principal surface of the electrical insulating film 14, and an end of this second conductor 15 and an end of the first conductors 13 are connected to an IC chip 16.

However, with the configuration illustrated in FIG. 1, the coil conductor formed at a bend of the flexible substrate 14 is adjacent to the end face of the magnetic material core 12, so the effect of magnetic flux closed in the vicinity of the coil conductor tends to cause an excess of self-inductance. Because of this, when an antenna is realized under the constraint of a constant self-inductance value, the problem arises of a reduced number of turns of the coil and a decreased sensitivity of the antenna. Additionally, because blocking part of a magnetic-flux transmitting surface of the magnetic material with part of the coil conductor reduces the size of an opening of the antenna, the problem arises of a reduction in the distance in which communications are possible.

SUMMARY

In an exemplary embodiment consistent with the claimed invention, a magnetic material antenna includes a flexible substrate on which a coil conductor is formed and a magnetic material core.

The coil conductor formed on the flexible substrate has a spiral shape that winds about a conductor opening section, and the flexible substrate includes a bend along a line passing through the conductor opening section of the coil conductor.

The magnetic material core of the magnetic material antenna is arranged in a state where an end face of the magnetic material core faces the bend in the flexible substrate, the magnetic material core includes a cut shape provided at a portion of the end face of the magnetic material core, and the portion of the end face faces the coil conductor passing through the bend of the flexible substrate. The cut shape separates the portion of the end face apart from the coil conductor.

With this configuration, the coil conductor formed at the bend of the flexible substrate is spaced apart from the end face of the magnetic material core by the cut shape (i.e., the cutout portion of the end face of the magnetic material core). Thus, the antenna is less susceptible to magnetic flux closed in the vicinity of the coil conductor, and self-inductance is not excessive. Therefore, the coil conductor having a necessary number of turns can be formed, and the antenna sensitivity can be increased. Additionally, because part of the coil conductor does not block part of a magnetic-flux transmitting surface of the magnetic material, the size of the opening of the antenna can be virtually large, the radiation efficiency of magnetic flux can be enhanced, and the distance in which communications are possible can be extended.

In another embodiment consistent with the claimed invention, a magnetic material antenna includes a flexible substrate on which a coil conductor is formed and a magnetic material core.

The coil conductor formed on the flexible substrate has a spiral shape that winds about a conductor opening section, and the flexible substrate includes a bend along a line passing through the conductor opening section of the coil conductor.

The magnetic material core is arranged in a state where part of the magnetic material core passes through a hole formed in the bend of the flexible substrate, the magnetic material core includes a cut shape provided at a portion of the magnetic material core facing a portion the coil conductor passing through the bend of the flexible substrate. The cut shape separates the portion of the magnetic material core apart from the portion of coil conductor.

With this configuration, the coil conductor is spaced apart from the magnetic material core by the cut in the portion where the magnetic material core passes through the hole formed in the bend of the flexible substrate. Thus, the antenna is less susceptible to magnetic flux closed in the vicinity of the coil conductor, and self-inductance is not excessive. Therefore, the coil conductor having a necessary number of turns can be formed, and the antenna sensitivity can be increased. Additionally, because part of the coil conductor does not block part of a magnetic-flux transmitting surface of the magnetic material, the size of the opening of the antenna can be virtually large, the radiation efficiency of magnetic flux can be enhanced, and the distance in which communications are possible can be extended.

According to a more specific exemplary embodiment, the cut shape may taper down toward the conductor opening section of the coil conductor.

With this configuration, magnetic flux concentrates on the tapered section and the opening section of the coil conductor, and the passage of the magnetic flux is facilitated. That is, the efficiency of collecting flux can be enhanced, and the antenna sensitivity can be further increased.

According to yet another more specific exemplary embodiment, the cut shape may be formed so as to extend along substantially the length of a coil conductor section extending in a direction perpendicular to the bend of the flexible substrate.

In another more specific exemplary embodiment, the magnetic material antenna may further include a low permeability member disposed at part or all of the cut shape, the low permeability member having a permeability lower than that of the magnetic material core.

With this configuration, when the flexible substrate is bent into a U shape, variations in the gap between the portions of the coil conductor facing each other can be made small and variations in the inductance value and capacitance between the portions of the coil conductor can be made small. Thus, stable characteristics are obtainable.

In another more specific exemplary embodiment, the low permeability member may be made of resin or a mixture of resin and magnetic material powder, and the low permeability member and the magnetic material core are integrally molded.

With this, the number of man-hours needed to assemble the magnetic material core and the flexible substrate can be reduced, and the cost of manufacturing can be reduced.

According to yet another more specific exemplary embodiment, the magnetic material may further include a dielectric member arranged at a location where portions of the coil conductor are made to face each other by the bend of the flexible substrate.

With this, the capacitance occurring between the portions of the coil conductor in a surface direction of the flexible substrate or the capacitance between the portions of the coil conductor facing each other within a surface of the flexible substrate can be set by the dielectric member, and each of the impedance and resonant frequency of the antenna can be set at a predetermined value.

In another more specific exemplary embodiment, the bend in flexible substrate may have a Z shape when viewed from a side of the flexible substrate.

With this, when the magnetic material core can become thinner, conductors above and below a non-magnetic material portion do not face each other, so there are no variations in characteristics caused by variations in the gap between facing portions.

According to another more specific embodiment, the coil conductor may include two divided coil conductor segments formed at two locations of the single flexible substrate, and the two coil conductor segments may be connected to each other in a direction in which currents produced by magnetic flux passing through opening sections of the two coil conductor segments by the magnetic material core with a shortest distance are in phase.

With this configuration, electromagnetic induction of the two coil conductor segments is added, and the effective number of turns of the coil can be increased without having to reduce the size of the opening section of each of the coil conductor segments. Thus, the antenna sensitivity can be improved.

According to another more specific exemplary embodiment, the coil conductor may include two divided coil conductor segments formed at two locations of the single flexible substrate, and the two coil conductor segments may be connected to each other in a direction in which currents produced by magnetic flux passing through opening sections of the two coil conductor segments by the magnetic material core inwardly and/or outwardly are in phase.

With this configuration, in the state where the antenna is mounted on an electrical apparatus, electromagnetic induction of the two coil conductor segments is added while magnetic flux passes inwardly and/or outwardly in the antenna, and the effective number of turns of the coil of the whole of the antenna can be increased without having to reduce the size of the opening of each of the coil conductor segments. Thus, the antenna sensitivity can be improved.

According to yet another more specific embodiment, an antenna device includes a magnetic material antenna according to any one of the above exemplary configurations, and a plate (for example, a board or a liquid crystal display (LCD) shield plate) can be provided adjacent to the magnetic material antenna and include a conductor spreading in a surface direction.

With this, the density of magnetic flux passing through the magnetic material core section and the opening section of the coil conductor is increased, and the antenna device having a high sensitivity can be configured.

Other features, elements, characteristics and advantages of embodiments consistent with the claimed inventions will become more apparent from the following detailed description with reference to the attached drawings.

DETAILED DESCRIPTION

Figure 1:
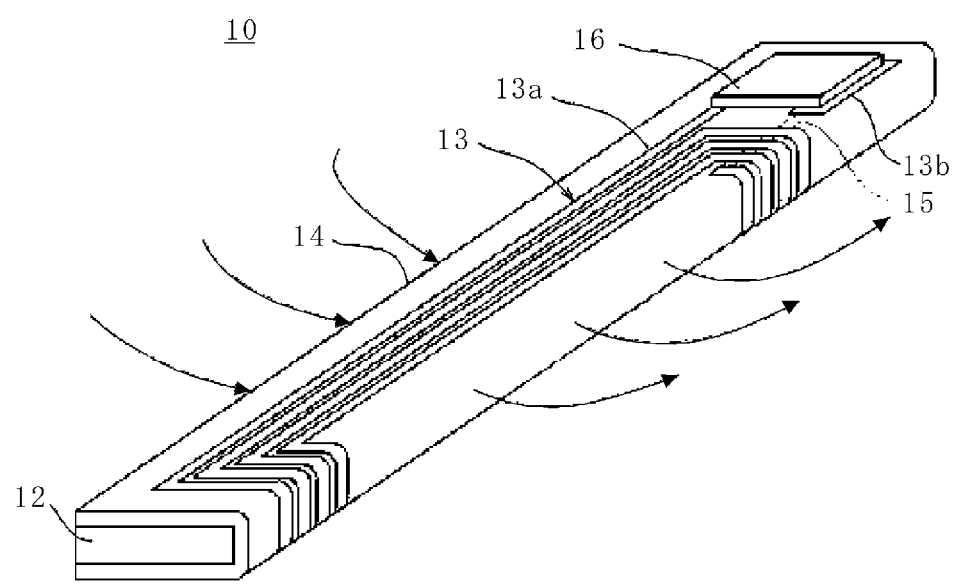
FIG. 1 is a perspective view of a magnetic material antenna illustrated in Patent Document 1.
Figure 2A:
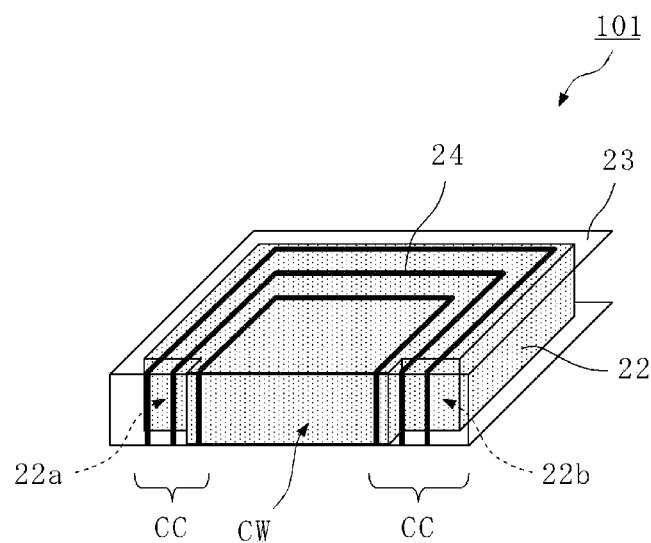
FIGS. 2A to 2C are illustrations of a configuration of a magnetic material antenna according to a first exemplary embodiment.
Figure 2B:
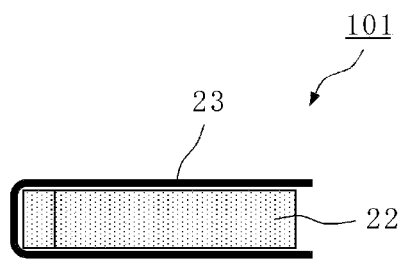
Figure 2C:
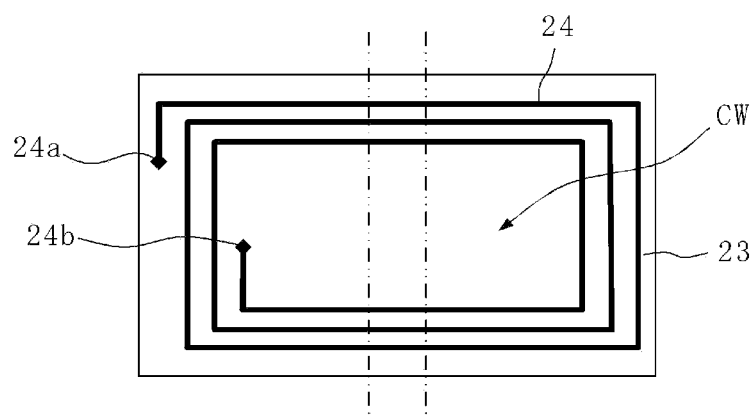

FIGS. 2A to 2C are illustrations of a configuration of a magnetic material antenna 101 according to a first exemplary embodiment. FIG. 2A is a perspective view of the magnetic material antenna 101, FIG. 2B is a side view thereof, and FIG. 2C is a developed plan view of a flexible substrate for use in the magnetic material antenna 101.

As illustrated in FIGS. 2A and 2B, the magnetic material antenna 101 includes a flexible substrate 23 on which a coil conductor 24 is formed and a magnetic material core 22. The spiral coil conductor (electrode) 24 is formed on the flexible substrate 23. The winding central section of the coil conductor 24 is formed as a conductor opening section CW. That is, the spiral coil conductor 24 is formed so as to surround the conductor opening section CW.

In FIG. 2C, the chain double-dashed lines indicate a location to be bent in the flexible substrate 23. As illustrated in FIGS. 2A and 2B, with respect to the magnetic material core 22, the flexible substrate 23 is bent along the chain double-dashed lines, and the flexible substrate 23 is arranged so as to envelop three surfaces of the magnetic material core 22.

The magnetic material core 22 includes cut shapes 22a and 22b disposed at portions of the magnetic material core 22 facing coil conductor sections CC at the bend of the flexible substrate 23. Therefore, the coil conductor sections CC at the bend of the flexible substrate 23 are separated apart from the portions of the magnetic material core 22 facing them. Therefore, the density of magnetic flux closed in the vicinity of the coil conductor is small, and the self-inductance is not excessive. Therefore, the coil conductor 24 having a necessary number of turns can be formed, and the antenna sensitivity can be increased. Additionally, because part of the coil conductor 24 does not block part of a magnetic-flux transmitting surface of the magnetic material core 22, the size of the opening of the antenna is virtually large, the radiation efficiency of magnetic flux is enhanced, and the distance in which communications are possible is extended.

It is to be noted that the cut shapes, or cutout portions 22a and 22b may be formed at part of the portions facing the coil conductor sections CC at the bend of the flexible substrate 23, as illustrated in FIG. 2A, without being formed along the whole of the coil conductor sections CC at the bend. Even in this case, although operational advantages are small, the advantage of virtually increasing the size of the opening of the antenna is offered.

The coil conductor 24 illustrated in this FIG. 2C has coil conductor connections 24a and 24b formed at the opposite ends thereof. The magnetic material antenna 101 is mounted such that these coil conductor connections 24a and 24b are electrically connected to electrodes on a target circuit board. The conductor (ground pattern) formed on the above circuit board and the magnetic material antenna 101 can comprise an antenna device. With this configuration, the magnetic material antenna is present at a position where the density of magnetic flux passing along the conductor on the circuit board is high, so antenna gain higher than that in the case of a single magnetic material antenna is obtainable.

Instead of the use of a circuit board, for example, a shield plate arranged at the back side of a liquid crystal display panel and a magnetic material antenna arranged on the shield plate can comprise an antenna device.

In FIGS. 3A to 3D, 3A is a top view of the magnetic material antenna 101 illustrated in FIG. 2A to 2C, 3B is a right side view thereof; 3C is a top view of a magnetic material antenna in the case where the cut shapes 22a and 22b of the magnetic material core 22 are not formed, and 3D is a right side view thereof. In FIGS. 3A to 3D, the broken lines indicate magnetic lines of force.

In such a manner, for the magnetic material antenna configured such that the coil is bent so as to envelop the magnetic material core, during actual use, magnetic flux goes in and out of the conductor opening section substantially perpendicularly thereto and also goes in and out of an electrode in the portion indicated by CA in the drawing substantially perpendicularly thereto. The quantity of linkage with magnetic flux of a counterpart antenna coil on the other side that communicates with the above antenna (the counterpart antenna coil is at a reader/writer side when the above antenna is at a card side; it is at a card side when the above antenna is at a reader/writer side) is relatively small, and contribution by the coil conductor on a surface substantially perpendicular to the conductor opening section (the coil conductor indicated by CA in the drawing) to the function of producing an electromotive voltage is relatively small.

Figures 3A, 3B:
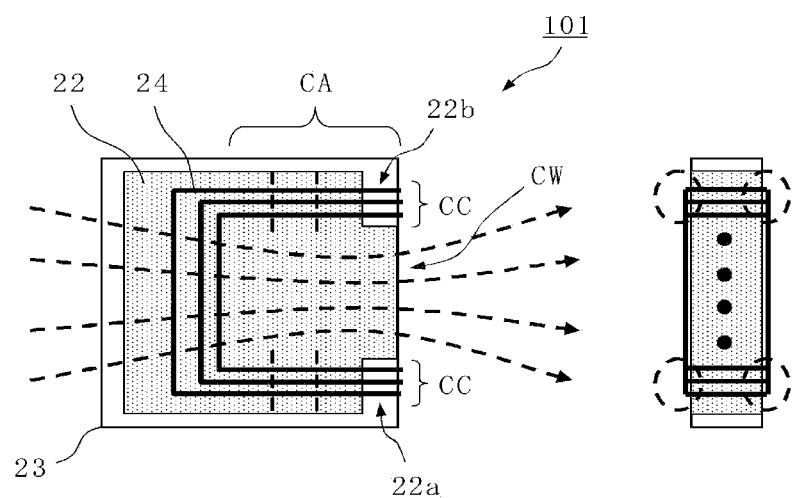
FIGS. 3A to 3D are conceptual diagrams that illustrate a distribution of magnetic flux of the magnetic material antenna according to the first exemplary embodiment and that of a magnetic material antenna according to a comparative example.
Figures 3C, 3D:
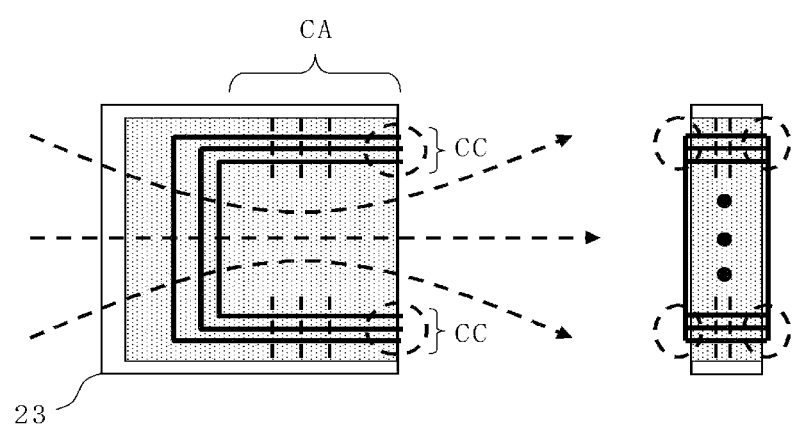

As illustrated in FIGS. 3C and 3D, if the cut shapes 22a and 22b do not exist, a magnetic circuit tends to be closed in the vicinity of the coil conductor sections CC at the bend of the flexible substrate 23 and in the portion indicated by CA, and as a result, self-inductance tends to be excessive. In addition, because the coil conductor sections CC at the bend are adjacent to the end face of the magnetic material core 22, the effective opening of the antenna is narrowed.

In contrast to this, for the magnetic material antenna according to the first exemplary embodiment, as illustrated in FIGS. 3A and 3B, the presence of the cut shapes 22a and 22b increases the proportion of magnetic flux perpendicularly passing through the conductor opening section CW to magnetic flux passing through the magnetic material core 22. Therefore, magnetic flux forming a closed magnetic circuit in the vicinity of the coil conductor sections CC at the bend of the flexible substrate 23 and in the portion indicated by CA is relatively reduced, so self-inductance is not excessive. Therefore, a necessary number of turns can be ensured, and antenna sensitivity can be increased. In addition, the density of magnetic flux passing through the conductor opening section CW in a horizontal direction in the drawing is increased correspondingly. In addition, because part of the coil conductor does not block part of the magnetic-flux transmitting surface of the magnetic material, the opening of the antenna is virtually increased, the radiation efficiency of magnetic flux is enhanced, and the distance in which communications are possible is extended.

In the first exemplary embodiment, as illustrated in FIG. 2C, the pitch of the coil conductor in the bend is smaller than the pitch of the coil conductor in surfaces perpendicular to the surface of the bend (upper and lower surfaces). Owing to this, the area of the magnetic-flux transmitting surface blocked by the coil conductor is small. Thus, antenna gain can be improved.

It is to be noted that, although in to the example illustrated in FIG. 2 the flexible substrate is bent 90 degrees at two locations so as to envelop three surfaces of the magnetic material core, it is not necessarily required that the flexible substrate be bend 90 degrees, and the flexible substrate may be curved so as to be wrapped around the magnetic material core. The same applies to the exemplary embodiments shown below.

Figure 4A:
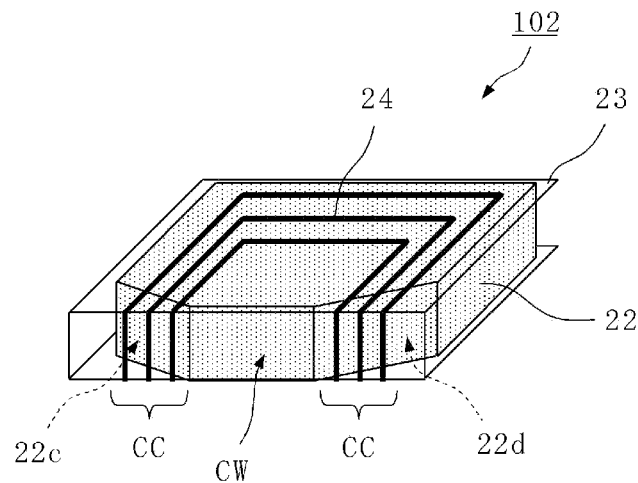
FIGS. 4A and 4B are respectively a perspective view and a three-view drawing of a magnetic material antenna according to a second exemplary embodiment.
Figure 4B:
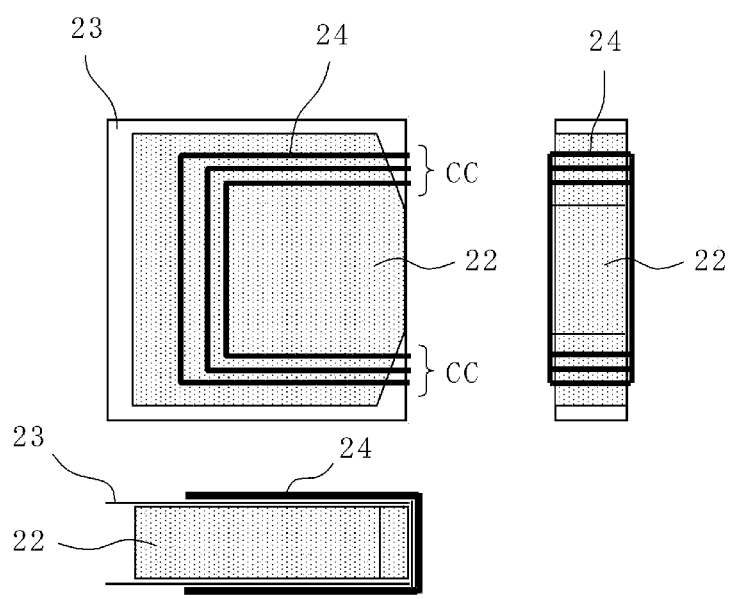

FIGS. 4A and 4B are illustrations of a configuration of a magnetic material antenna 102 according to a second exemplary embodiment. FIG. 4A is a perspective view thereof, and FIG. 4B is a three-view drawing thereof. As illustrated in FIG. 4A, magnetic material antenna 102 is arranged in the state where an end face of the magnetic material core 22 faces the bend of the flexible substrate 23, and the magnetic material core 22 includes cut shapes 22c and 22d tapering down toward the conductor opening section CW at portions of the end face of the magnetic material core 22, the portions facing the coil conductor sections CC at the bend of the flexible substrate 23.

In such a manner, the cut shapes tapering down toward the conductor opening section CW causes magnetic flux to concentrate on the tapered portion and concentrate on the opening section of the coil conductor, and this facilitates the passage of the magnetic flux. That is, the efficiency of collecting flux is enhanced, and the antenna sensitivity is increased.

Figure 5A:
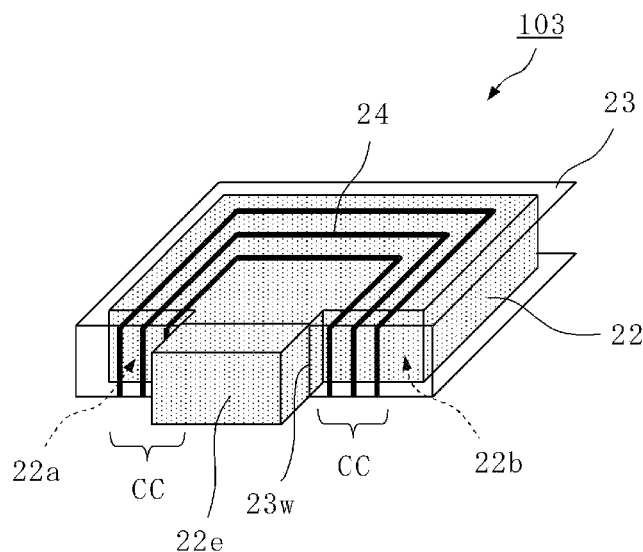
FIGS. 5A and 5B are respectively a perspective view of a magnetic material antenna according to a third exemplary embodiment and a developed plan view of a flexible substrate for use therein.
Figure 5B:
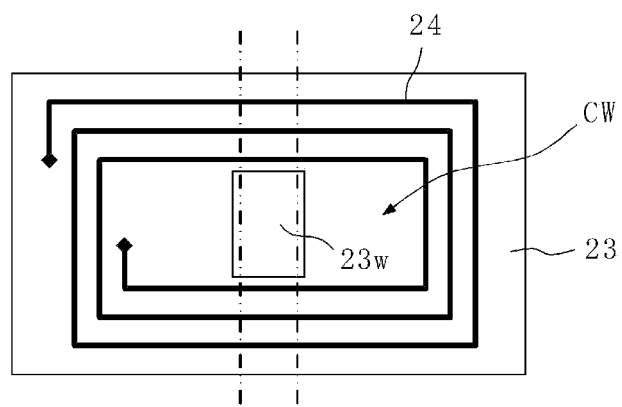

FIGS. 5A and 5B are illustrations of a configuration of a magnetic material antenna 103 according to a third exemplary embodiment. FIG. 5A is a perspective view of magnetic material antenna 103, and FIG. 5B is a developed plan view of the flexible substrate 23 for use in the magnetic material antenna 103.

This magnetic material antenna 103 includes the flexible substrate 23 on which the coil conductor 24 is formed and the magnetic material core 22. The spiral coil conductor 24, which defines its winding central section as the conductor opening section CW, is formed on the flexible substrate 23, and a hole 23W is formed in the center of the conductor opening section CW.

The magnetic material core 22 is arranged in the state where a projection 22e thereof passes through the hole 23W formed in the bend of the flexible substrate 23. In addition, the cut shapes 22a and 22b are formed to separate, or set portions of the magnetic material core 22 facing the coil conductor sections CC at the bend of the flexible substrate 23 apart from the coil conductor sections CC.

For this magnetic material antenna 103, the hole 23W is disposed, or provided at a portion the flexible substrate 23 that avoids overlapping with the coil conductor sections CC at the bend of the flexible substrate 23, and the projection 22e of the magnetic material core projects therefrom. Thus, the coil conductor sections CC at the bend do not narrow the opening of the antenna, and the projecting of the projection 22e of the magnetic material core increases the advantage of collecting flux.

FIGS. 6A to 6D are perspective views of four respective magnetic material antennas 111 to 114 having different shapes according to a fourth exemplary embodiment. For the magnetic material antenna 111 illustrated in FIG. 6A, the projection 22e of the magnetic material core 22 projects from the hole 23W formed in the flexible substrate 23, and the tapered cut shapes 22c and 22d are formed at portions facing the coil conductor sections CC at the bend of the flexible substrate 23.

Figure 6A:
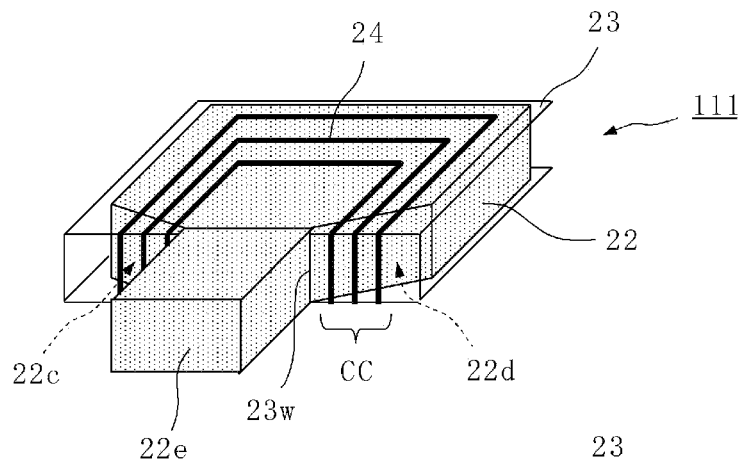
FIGS. 6A to 6D are perspective views of four magnetic material antennas according to a fourth exemplary embodiment.
Figure 6B:
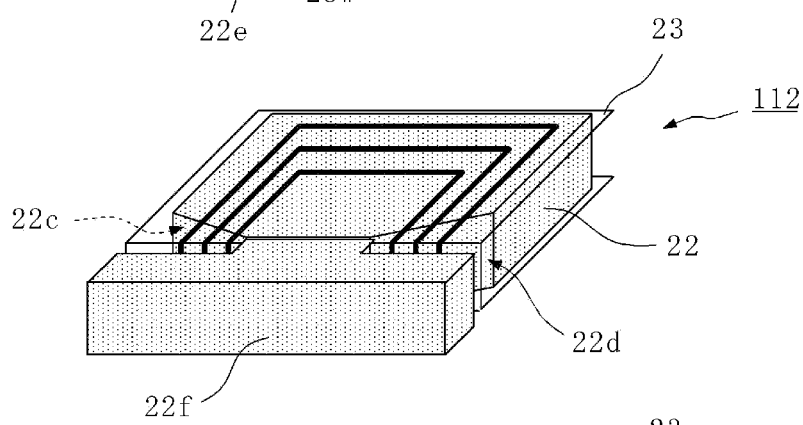

The magnetic material antenna 112 illustrated in FIG. 6B is one in which a magnetic material core collar 22f is formed on the projection in the state illustrated in FIG. 6A. At least a portion of this magnetic material core collar 22f that faces the coil conductor sections at the bend of the flexible substrate 23 (i.e., the coil conductor sections CC as illustrated in FIG. 6A) is separated, or spaced apart from those coil conductor sections. Owing to this, a problem caused by an increase in self-inductance is solved and the advantage of collecting flux is enhanced.

Figure 6C:
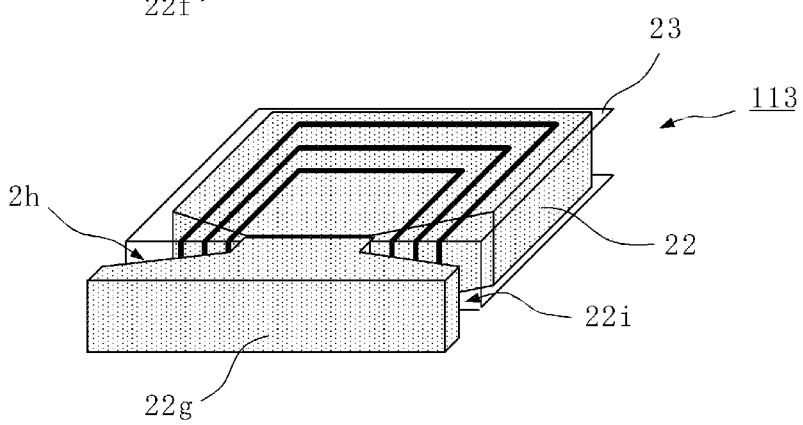

For the magnetic material antenna 113 illustrated in FIG. 6C, a magnetic material core collar 22g also includes tapered cut shapes 22h and 22i at portions facing the coil conductor sections at the bend of the flexible substrate 23 (i.e., the coil conductor sections CC as illustrated in FIG. 6A).

In such a manner, the magnetic material core collar 22g also has a tapered shape down toward the conductor opening section, thereby avoiding a problem of an increase in self-inductance and suppressing magnetic resistance by reducing the distance of a portion of the magnetic material core 22 that causes a bottleneck. This further increases the advantage of collecting flux.

Figure 6D:
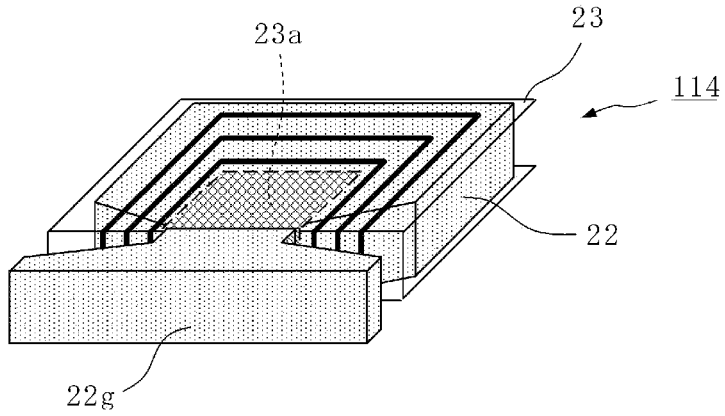

A magnetic material antenna 114 illustrated in FIG. 6D is an example in which, in forming a hole (hole 23W illustrated in FIG. 6A) in the flexible substrate 23, the hole is produced by making a slit in only three sides of the hole and folding the remaining side back without completely hollowing the flexible substrate out. A folded section 23a in forming the hole in the flexible substrate 23 may be folded inward, or may also be folded outward.

It is to be noted that the magnetic material core collars 22f and 22g illustrated in FIGS. 6B to 6D can be shaped independently from the main body section of the magnetic material core 22 and can be bonded to the main body section of the magnetic material core 22 in assembling together with the flexible substrate 23, or alternatively, the magnetic material core collars 22f and 22g can be shaped integrally with the main body section of the magnetic material core 22 in advance, the magnetic material core collars 22f and 22g can be made to pass through the hole 23W of the flexible substrate 23, and after that, the flexible substrate 23 can be bent.

Figure 7A:
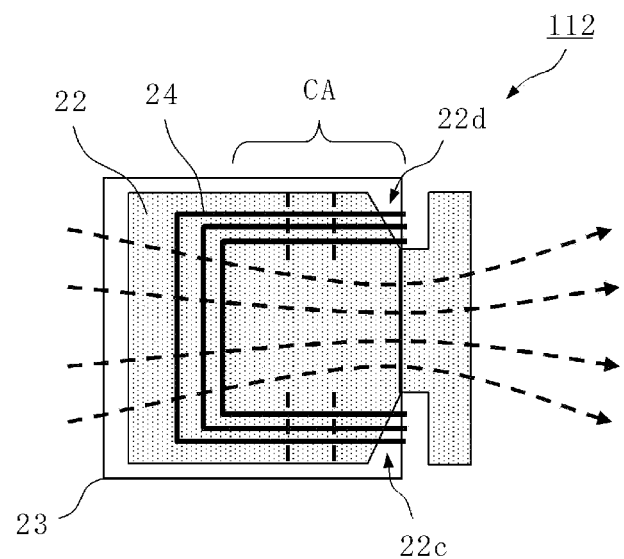
FIGS. 7A and 7B respectively show a conceptual diagram that illustrates a distribution of one of the magnetic material antennas according to the fourth exemplary embodiment and that of a magnetic material antenna according to a comparative example.
Figure 7B:
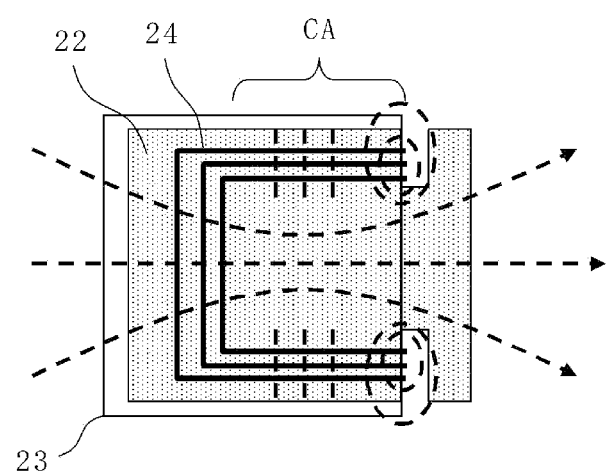

Here, using the magnetic material antenna 112 illustrated in FIG. 6B and, as its comparative example, a magnetic material antenna including the magnetic material core 22 not having the cut shapes 22c and 22d, operational advantages of the cut shapes 22c and 22d are described based on FIGS. 7A and 7B.

FIG. 7A is a top view of the magnetic material antenna 112 illustrated in FIG. 6B, and FIG. 7B is a top view of a magnetic material antenna including the magnetic material core 22 not having the cut shapes 22c and 22d.

In FIGS. 7A and 7B, the broken lines indicate lines of magnetic force. In the drawing, the contribution by the coil conductor in the portion indicated by CA of the coil conductor 24 is relatively small to an operation of producing electromotive voltage with respect to a magnetic field passing substantially straight from left to right. As illustrated in FIG. 7B, if the cut shapes 22c and 22d are absent, a magnetic circuit tends to be closed in the vicinity of the coil conductor section at the bend of the flexible substrate 23, and as a result, self-inductance tends to be excessive.

In contrast to this, for the magnetic material antenna 112 illustrated in FIG. 7A, self-inductance is not excessive because the presence of the cut shapes 22c and 22d reduces a tendency of a closed magnetic circuit occurring in the vicinity of the coil conductor section at the bend of the flexible substrate 23. Therefore, the coil conductor having a necessary number of turns can be formed, and the antenna sensitivity can be increased. Additionally, the density of magnetic flux passing through the conductor opening section in a horizontal direction in the drawing is increased correspondingly.

FIGS. 8A to 8D are perspective views of four respective magnetic material antennas 121 to 124 having different shapes according to a fifth exemplary embodiment.

Figure 8A:
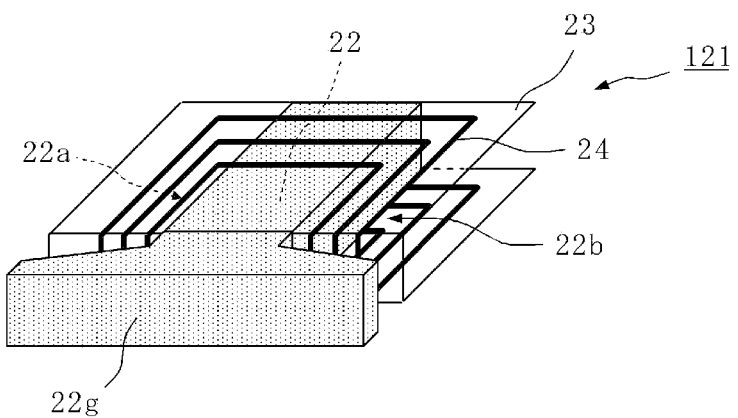
FIGS. 8A to 8D are perspective views of four magnetic material antennas according to a fifth exemplary embodiment.

The magnetic material antenna 121 illustrated in FIG. 8A is one in which the cut shapes 22a and 22b of the magnetic material core 22 are formed so as to extend along substantially the length extending perpendicularly to the bend of the flexible substrate 23. Additionally, in this example, the magnetic material core collar 22g is disposed, or provided at a portion of the magnetic material core 22 that projects from the flexible substrate 23.

Figure 8B:
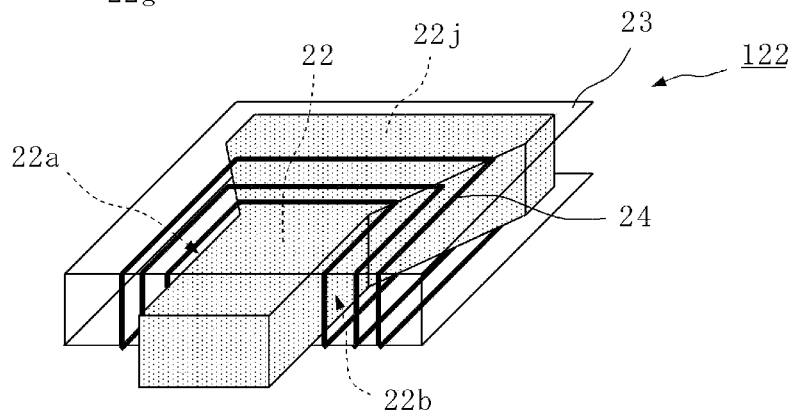

For the magnetic material antenna 122 illustrated in FIG. 8B, the cut shapes 22a and 22b of the magnetic material core 22 are formed so as to extend along substantially the length extending perpendicularly to the bend of the flexible substrate 23, and the basal portions from the cut shapes (rear portions in the drawing) are tapered to the magnetic material core collar 22j and have a larger width.

Figure 8C:
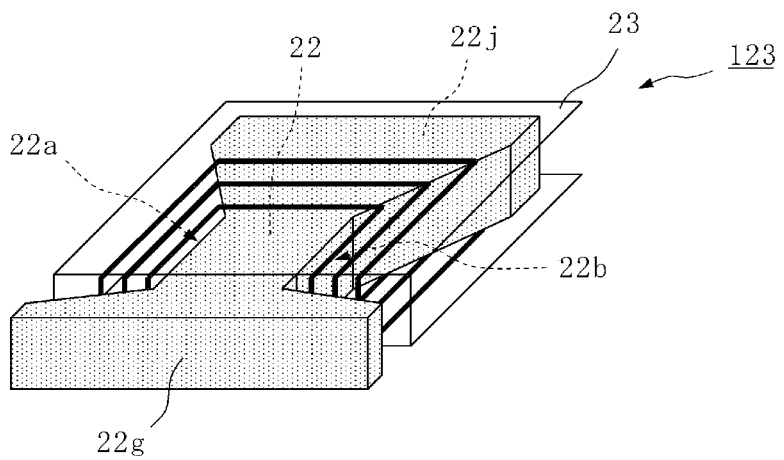

The magnetic material antenna 123 illustrated in FIG. 8C is equal to one in which the magnetic material core collar 22g is disposed on the projection of the magnetic material core 22 in the state illustrated in FIG. 8B.

Figure 8D:
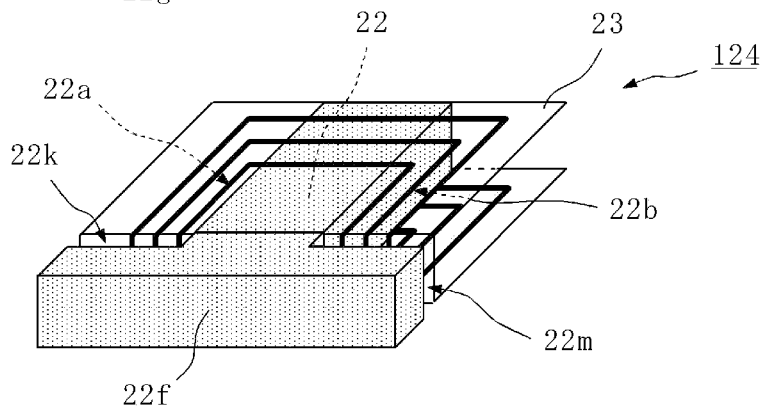

The magnetic material antenna 124 illustrated in FIG. 8D is similar to the magnetic material antenna 121 shown in FIG. 8A, but the antenna 124 is provided with a magnetic material core collar 22f that does not have a taperlike the magnetic material core collar 22g.

Even with this shape, the cut shapes 22k and 22m are provided at a portion where the coil conductor section at the bend of the flexible substrate 23 and the magnetic material face each other. Thus, the above-described problem caused by an increase in self-inductance can be avoided.

Figure 9A:
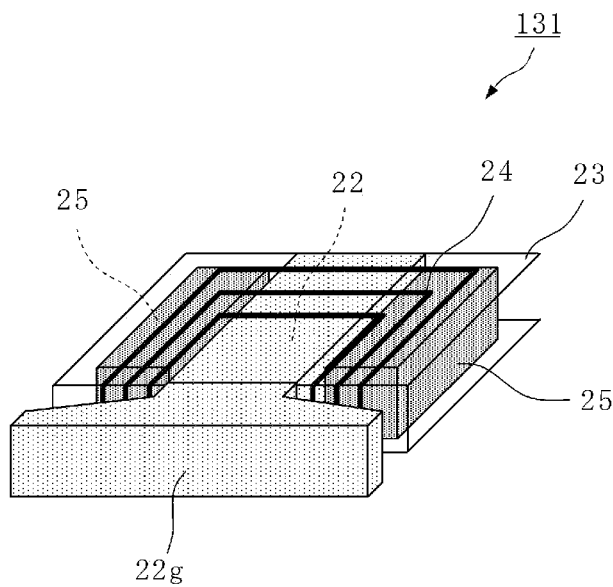
FIGS. 9A and 9B are perspective views of two magnetic material antennas according to a sixth exemplary embodiment.
Figure 9B:
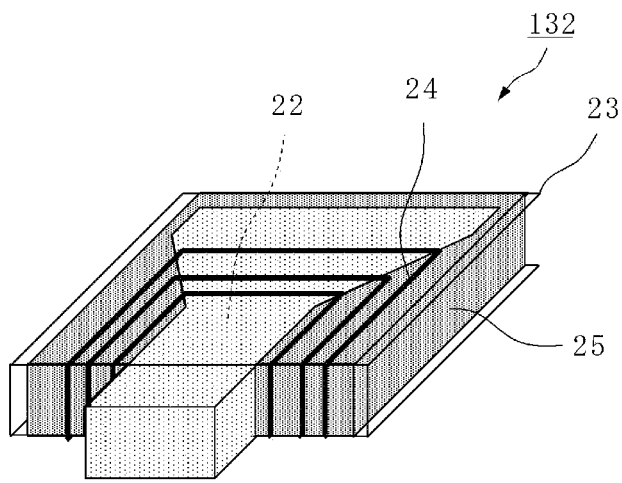

FIGS. 9A and 9B are perspective views of respective magnetic material antennas 131 and 132 having different configurations according to a sixth exemplary embodiment.

The magnetic material antenna 131 illustrated in FIG. 9A is one in which a low permeability member 25 is arranged in a portion of each of the cut shapes 22a and 22b of the magnetic material core in the state illustrated in FIG. 8A.

The magnetic material antenna 132 illustrated in FIG. 9B is one in which the low permeability member 25 is arranged at a location that contains the cut shapes 22a and 22b of the magnetic material core in the state illustrated in FIG. 8B.

In either configuration, because of the presence of the low permeability member 25, bending of the flexible substrate 23 into a U shape regulates the gap between the portions facing each other, so inductance and capacitance occurring in the coil conductor 24 can be stabilized.

It is to be noted that the low permeability member 25 illustrated in FIGS. 9A and 9B may be made of resin or a mixture of resin and magnetic powder. The low permeability member 25 can be configured independently from the magnetic material core 22. Alternatively, it can also be molded integrally with the magnetic material core 22. This can reduce the number of man-hours needed to assemble both the magnetic material core and the flexible substrate and reduce the cost of manufacturing.

Figure 10:
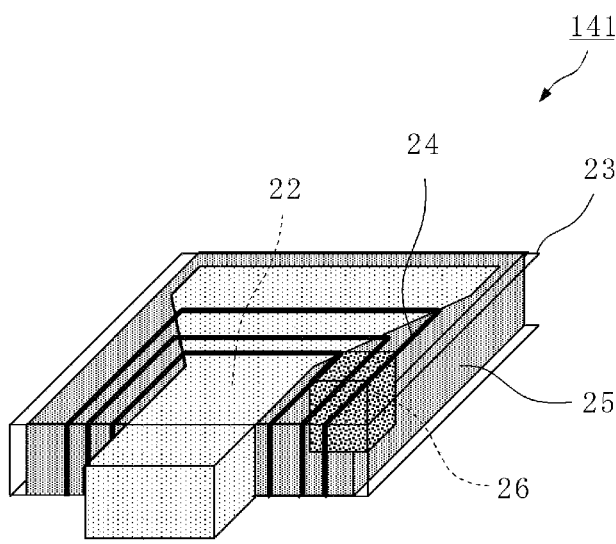
FIG. 10 is a perspective view of a magnetic material antenna according to a seventh exemplary embodiment.

FIG. 10 is a perspective view of a magnetic material antenna 141 according to a seventh exemplary embodiment. The magnetic material antenna 141 is one in which, in the structure illustrated in FIG. 9B, a dielectric member 26 is arranged at a location where portions of the coil conductor 24 are made to face each other by the bending of flexible substrate 23. With such a structure, the capacitance occurring between the portions of the coil conductors in a surface direction of the flexible substrate or between the portions of the coil conductors facing each other within a surface of the flexible substrate is set by the dielectric member 26, and the impedance and resonant frequency of the antenna can be set at a predetermined value.

Figure 11A:
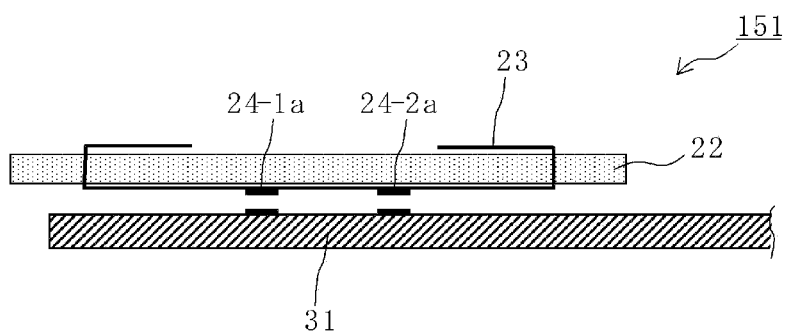
FIGS. 11A and 11B are illustrations of a configuration of a magnetic material antenna according to an eighth exemplary embodiment.
Figure 11B:
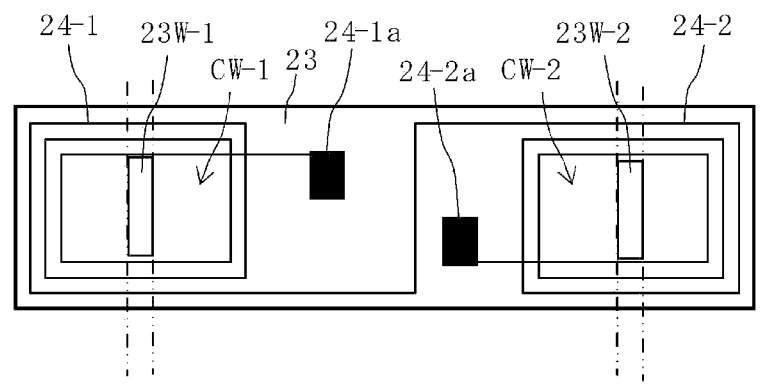

FIGS. 11A and 11B are illustrations of a configuration of a magnetic material antenna 151 according to an eighth exemplary embodiment. FIG. 11A is a cross-sectional view that illustrates a state where the magnetic material antenna 151 opposes a board 31 of an electronic apparatus. FIG. 11B is a developed plan view of a flexible substrate for use in the magnetic material antenna 151.

The flexible substrate 23 illustrated in each of the first to seventh exemplary embodiments includes a single spiral coil conductor 24. In contrast, for this eighth exemplary embodiment, as illustrated in FIG. 11B, the flexible substrate 23 includes spiral coil conductors 24-1 and 24-2 having holes 23W-1 and 23W-2, respectively, in their respective conductor opening sections. The two coil conductors 24-1 and 24-2 are connected to each other in a direction in which currents produced by magnetic flux passing through opening sections CW-1 and CW-2 of the two coil conductors 24-1 and 24-2 by the magnetic material core 22 with the shortest distance are in phase, and first ends of the coil conductors are formed as coil conductor connections 24-1a and 24-2a.

In such a manner, as illustrated in FIG. 11A, the single flexible substrate 23 is bent at portions indicated by the chain double-dashed lines in the drawing such that both ends of the magnetic material core 22 pass through the holes 23W-1 and 23W-2 of the flexible substrate 23. In this way, the magnetic material antenna 151 can be configured.

In mounting the magnetic material antenna 151 on the board 31, the coil conductor connections 24-1a and 24-2a are formed on the mounting surface of the flexible substrate 23 opposing the board 31, and they are connected to conductors of the board 31.

This magnetic material antenna 151 is employed such that magnetic flux passes through from one end to the other end (for example, from right end to left end in the drawing). Accordingly, an antenna device using an additional magnetic material antenna 151 mounted on the board 31 and employed such that magnetic flux passes from the center of the board 31 in a horizontal direction may be configured.

FIGS. 12A to 12C and FIGS. 13A and 13B are illustrations of configurations of a magnetic material antenna 161 according to a ninth exemplary embodiment.

Figure 13A:
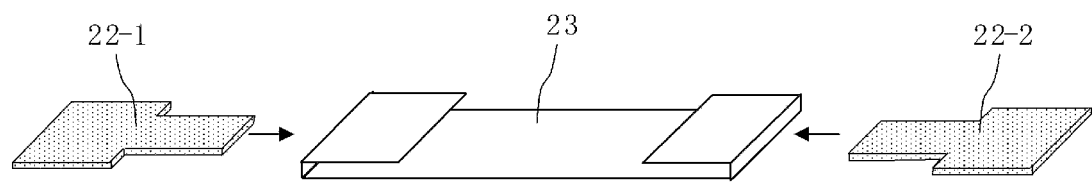
FIGS. 13A and 13B are perspective views of the magnetic material antenna.
Figure 13B:
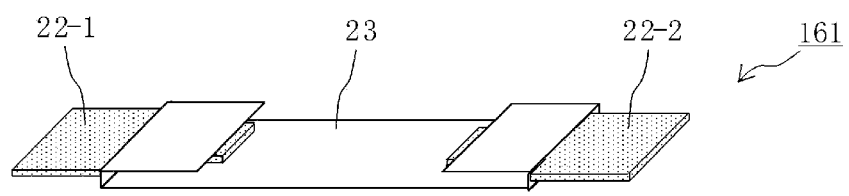

This magnetic material antenna according to the ninth exemplary embodiment uses the single flexible substrate 23 and two magnetic material cores 22-1 and 22-2, as illustrated in FIGS. 13A and 13B.

Figure 12A:
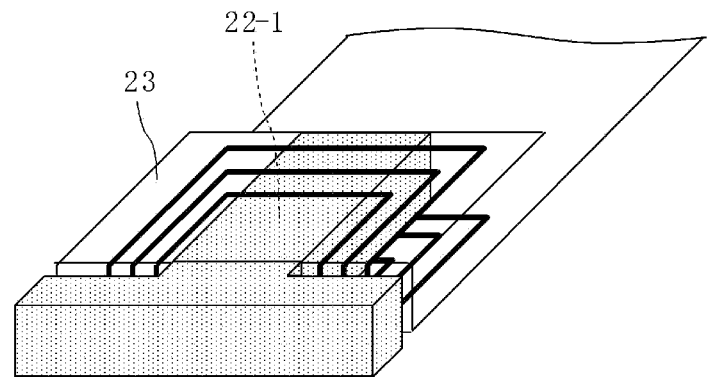
FIG. 12A is a partial perspective view of a magnetic material antenna according to a ninth exemplary embodiment.
Figure 12B:
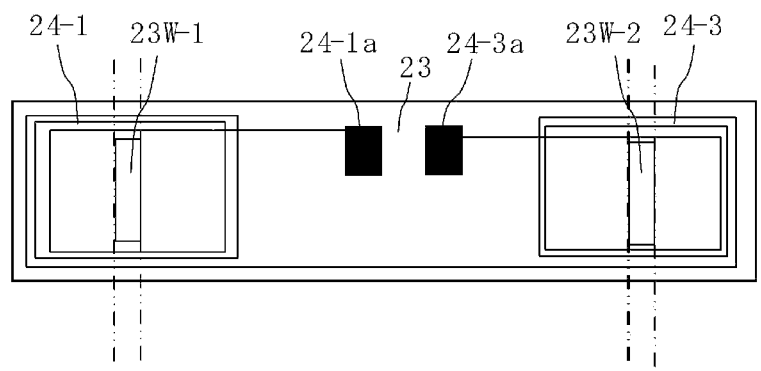
FIGS. 12B and 12C are developed plan views of a flexible substrate for use therein.
Figure 12C:
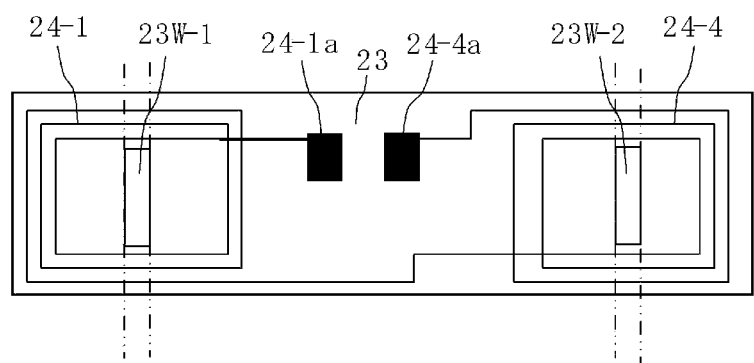

FIG. 12A is a partial perspective view that illustrates a relationship between a first end of the flexible substrate 23 and the magnetic material core 22-1. FIGS. 12B and 12C illustrate two examples of coil conductors having different patterns formed on the flexible substrate 23.

In the example of FIG. 12B, the coil conductors 24-1 and 24-3 are formed on the flexible substrate 23, the flexible substrate 23 is bent at the chain double-dashed lines, and the magnetic material cores 22-1 and 22-2 are inserted into the holes 23W-1 and 23W-2, respectively. In this state, these coil conductors 24-1 and 24-3 are connected to each other in a direction in which currents produced by magnetic flux passing through the two coil conductors 24-1 and 24-3 inwardly and/or outwardly by the above two magnetic material cores 22-1 and 22-2 are in phase. First ends of the coil conductors are formed as coil conductor connections 24-1a and 24-3a.

Also in the example illustrated in FIG. 12C, the two coil conductors 24-1 and 24-4 are connected to each other in a direction in which currents produced by magnetic flux passing through the two coil conductors 24-1 and 24-4 inwardly and/or outwardly by the two magnetic material cores 22-1 and 22-2 are in phase. First ends of the coil conductors are formed as coil conductor connections 24-1a and 24-4a.

Figure 14A:
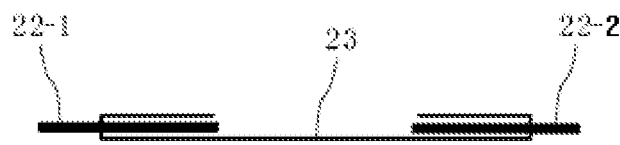
FIGS. 14A to 14D are illustrations of a configuration of a magnetic material antenna according to a tenth exemplary embodiment.
Figure 14B:
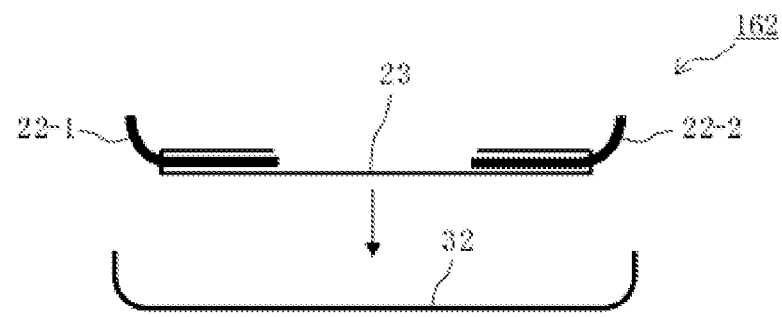
Figure 14C:
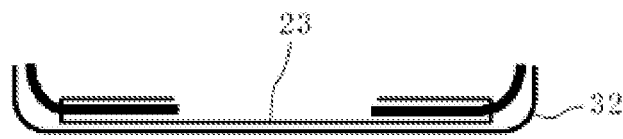

FIGS. 14A to 14D and FIG. 15 are illustrations of configurations of a magnetic material antenna according to a tenth exemplary embodiment. FIG. 14A is a side view of the magnetic material antenna in a process of being configured. This is the same as the configuration of a magnetic material antenna 161 illustrated in FIG. 13B. That is, it includes the single flexible substrate 23 and the two magnetic material cores 22-1 and 22-2. FIG. 14B illustrates a magnetic material antenna 162 in which a tip of each of the magnetic material cores 22-1 and 22-2 in the state illustrated in FIG. 14A is curved round. This is mounted by being attached along a casing 32 of an electronic apparatus. That state is illustrated in FIG. 14C.

Figure 14D:
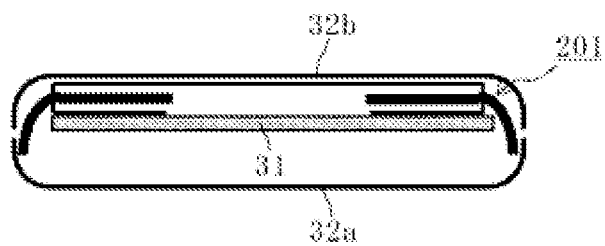

FIG. 14D illustrates an example in which the magnetic material antenna 162 illustrated in FIG. 14B is mounted between the board 31 and a casing 32b so as to be along the side of the casing of the electronic apparatus. The board 31 includes a conductor spreading in its surface direction. This board 31 and the magnetic material antenna 162 constitute an antenna device 201.

Figure 15:
FIG. 15 is an illustration of another configuration of the magnetic material antenna.

FIG. 15 illustrates a configuration example for maintaining the shape of the curved sections of the magnetic material cores 22-1 and 22-2 of a magnetic material antenna 163 having the shape illustrated in FIG. 14B. Here, the tip of each of the magnetic material cores 22-1 and 22-2 is maintained in a curved shape by a shape maintaining element 33, such as resin or adhesive.

It is to be noted that the magnetic material core may be a composite element in which thermoplastic resin and magnetic powder are mixed. The shape maintaining element 33 may be disposed at an inner portion of the curved surface of each of the magnetic material cores 22-1 and 22-2.

In such a manner, the bending of the end of the magnetic material core facilitates the passage of magnetic flux in a direction perpendicular to the surface of the conductor opening section, extends the distance in which communications are possible, and reduces a region where communications are impossible.

Figure 16A:
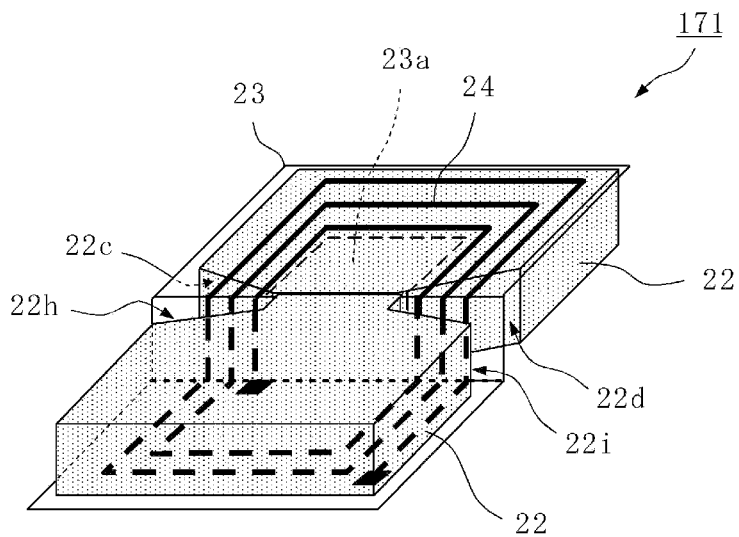
FIGS. 16A and 16B are perspective views of two magnetic material antennas according to an eleventh exemplary embodiment.
Figure 16B:
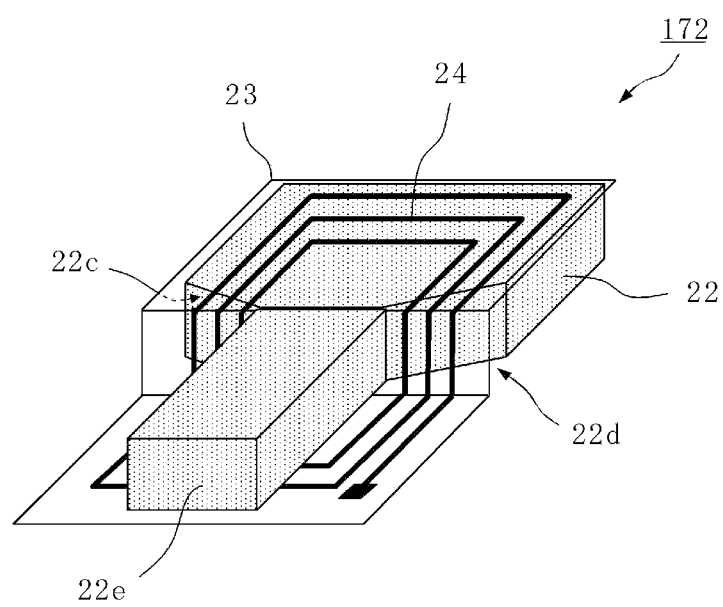

FIGS. 16A and 16B are perspective views of respective magnetic material antennas 171 and 172 according to an eleventh exemplary embodiment. In the exemplary embodiments described above, the flexible substrate 23 is bent into a U shape so as to envelop the magnetic material core. In this eleventh exemplary embodiment, the flexible substrate 23 is bent into a Z shape when viewed from its side.

For the magnetic material antenna 171 illustrated in FIG. 16A, the spiral coil conductor 24 defining its winding central section as a conductor opening section is formed on the flexible substrate 23, a hole is formed in its bend, and the magnetic material core 22 passes through the hole. The cut shapes 22c, 22d, 22h, and 22i are formed at portions of the magnetic material core 22 that face the coil conductor 24 at the bend of the flexible substrate 23. The cut shapes 22c, 22d, 22h, and 22i separate the facing portions of the magnetic material core apart from the coil conductor 24 at the bend portion.

With such a structure, magnetic flux passing from the front end to the back end of the magnetic material core 22 in the drawing induces a voltage in the coil conductor 24.

It is to be noted that the coil conductor connection is formed on the bottom surface of the flexible substrate 23 so as to be electrically connected to an electrode on a mounting board.

For a magnetic material antenna 172 illustrated in FIG. 16B, a projection 22e of the magnetic material core 22 projects through the hole in the bend portion of the flexible substrate 23. This structure is similar to the magnetic material antenna 171 shown in FIG. 16A except the cut shapes 22h and 22i are formed along the entire length extending perpendicularly from the hole in the bend portion of the flexible substrate 23.

Figure 17A:
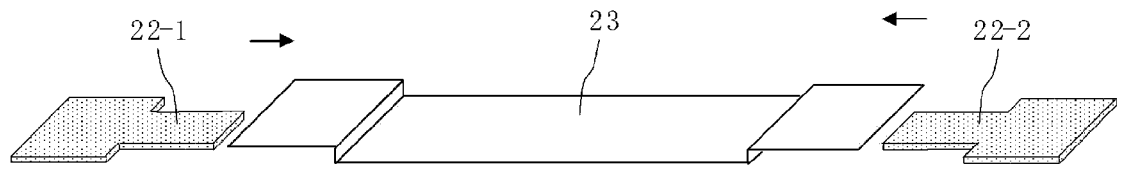
FIGS. 17A and 17B are perspective views of a configuration of a magnetic material antenna according to a twelfth exemplary embodiment.
Figure 17B:
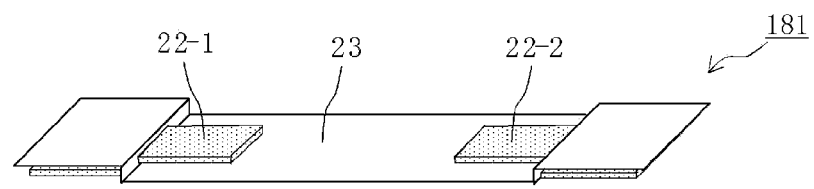

FIGS. 17A and 17B are illustrations of a configuration of a magnetic material antenna according to a twelfth exemplary embodiment. FIG. 17A illustrates a state in which the two magnetic material cores 22-1 and 22-2 are being placed on the flexible substrate 23. A coil conductor (not shown in FIG. 17A) having substantially the same pattern as the one illustrated in FIG. 12B or 12C is formed on the flexible substrate 23. In contrast to the example illustrated in FIGS. 13A and 13B, both ends of the flexible substrate 23 are bent into a Z shape. A magnetic material antenna 181 illustrated in FIG. 17B is configured by the insertion of the magnetic material cores 22-1 and 22-2 into holes formed in two bends of the flexible substrate 23.

Figure 18A:
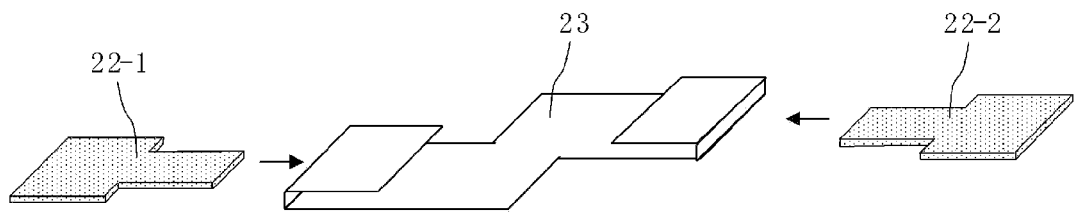
FIGS. 18A and 18B are perspective views of a configuration of a magnetic material antenna according to a thirteenth exemplary embodiment.
Figure 18B:
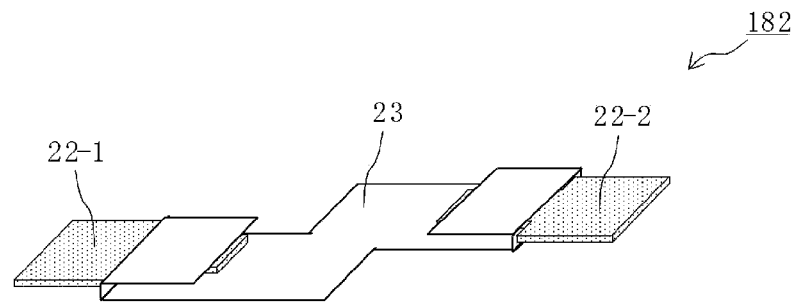

FIGS. 18A and 18B are illustrations of a configuration of a magnetic material antenna according to a thirteenth exemplary embodiment. FIG. 18A illustrates a state in which the magnetic material cores 22-1 and 22-2 are being placed on the flexible substrate 23. However, unlike the example illustrated in FIGS. 13A and 13B, the flexible substrate 23 is formed such that, in the state in which the magnetic material cores 22-1 and 22-2 are placed on the flexible substrate 23, as illustrated in FIG. 18B, the two magnetic material cores 22-1 and 22-2 have different axes.

Even with such a structure, magnetic flux passes through the magnetic material cores 22-1 and 22-2 from inward to outward, or in its opposite direction, so it acts as an antenna. Such a structure allows for arranging the flexible substrate 23 and the magnetic material cores 22-1 and 22-2 while avoiding overlapping with another electronic component or structure of a mounting target.

It is to be noted that, although a single-layer coil conductor is formed on the flexible substrate in the above-illustrated exemplary embodiments, the coil conductor can be multilayered. This can reduce a footprint and increase the Q value.

Additionally, lines of a coil conductor that are connected in series can be arranged in a substantially alternating sequence with respect to a surface of the conductor opening section and a surface of the perpendicular thereto. That is, lines facing each other with a distance of the order of the thickness of a substrate or a magnetic material may be configured so as to be displaced in the direction of the line width such that their overlaps are reduced. With such a configuration, line-to-line capacitance is reduced, and concentration of electromagnetic fields is relieved (distributed). Thus, in particular, even if the thickness is reduced, a rise in impedance can be decreased.

Accordingly, exemplary embodiments consistent with the claimed invention can provide a highly sensitive magnetic material antenna and antenna device capable of ensuring a necessary number of turns, having a widened opening of the antenna in the vicinity of a magnetic-flux transmitting surface of a magnetic material core, and thus having an enhanced radiation efficiency of magnetic flux.

Additionally, a coil conductor having a necessary number of turns can be formed and antenna sensitivity can be enhanced without causing an excess of self-inductance. Also, because part of the coil conductor does not block part of a magnetic-material transmitting surface of the magnetic material, the opening of the antenna can be virtually large, the radiation efficiency of magnetic flux can be enhanced, and the distance in which communications are possible can be extended.

Although a limited number of exemplary embodiments are described herein, one of ordinary skill in the art will readily recognize that there could be variations to any of these exemplary embodiments and those variations would be within the scope of the appended claims. Thus, it will be apparent to those skilled in the art that various changes and modifications can be made to the magnetic material antenna and antenna device described herein without departing from the scope of the appended claims and their equivalents.

What is claimed is:

1. A magnetic material antenna comprising a flexible substrate on which a coil conductor is formed and a magnetic material core,
    wherein a surface of the flexible substrate is folded back such that portions of the surface face each other with a bend therebetween,
    wherein the coil conductor formed on the flexible substrate has a spiral shape that winds about a conductor opening section, and the bend is along a line passing through the conductor opening section of the coil conductor,
    wherein the magnetic material core is arranged in a state where part of the magnetic material core passes through a hole formed in the bend of the flexible substrate, the magnetic material core includes an end portion facing a portion of the coil conductor passing through the bend of the flexible substrate, and the end portion of the magnetic material core is spaced apart from the bend where of the coil conductor passes through.

2. The magnetic material antenna according to claim 1, wherein the end portion of the magnetic material core tapers down toward the conductor opening section of the coil conductor.

3. The magnetic material antenna according to claim 1, wherein the end portion of the magnetic material core is formed so as to extend along substantially the length of a coil conductor section extending in a direction perpendicular to the bend of the flexible substrate.

4. The magnetic material antenna according to claim 1, further comprising a low permeability member disposed at part or all of the end portion of the magnetic material core, the low permeability member having a permeability lower than that of the magnetic material core.

5. The magnetic material antenna according to claim 4, wherein the low permeability member is made of resin or a mixture of resin and magnetic material powder, and the low permeability member and the magnetic material core are integrally molded.

6. The magnetic material antenna according to claim 1, further comprising a dielectric member arranged at a location where portions of the coil conductor face each other by forming the bend of the flexible substrate.

7. The magnetic material antenna according to claim 1, wherein the coil conductor comprises two divided coil conductor segments formed at two locations of the single flexible substrate, and the two coil conductor segments are connected to each other in a direction in which currents produced by magnetic flux passing through opening sections of the two coil conductor segments by the magnetic material core with a shortest distance are in phase.

8. The magnetic material antenna according to claim 1, wherein the coil conductor comprises two divided coil conductor segments formed at two locations of the single flexible substrate, and the two coil conductor segments are connected to each other in a direction in which currents produced by magnetic flux passing through opening sections of the two coil conductor segments by the magnetic material core are in phase.

9. An antenna device comprising:
    a magnetic material antenna according to claim 1; and
    a plate adjacent to a surface of the flexible substrate and including a conductor extending in a surface direction of the surface of the flexible substrate.

* * * * *